United States Patent [19]
Kennedy et al.

[11] Patent Number: 5,931,086
[45] Date of Patent: Aug. 3, 1999

[54] APPARATUS FOR THE ASSEMBLY OF SANDWICH PRODUCTS

[75] Inventors: Cory R. Kennedy, Richmond, Va.; Yancey Grubzak, Montrose, Calif.

[73] Assignee: Interbake Dairy Ingredients, Richmond, Va.

[21] Appl. No.: 08/964,938

[22] Filed: Nov. 5, 1997

[51] Int. Cl.⁶ .............. A21C 9/04; A21C 15/00; A23P 1/00
[52] U.S. Cl. ............ 99/450.4; 99/450.7; 425/40; 425/145; 425/207; 425/308
[58] Field of Search ............ 99/484, 485, 450.1–450.4, 99/450.5, 450.6, 450.7, 494; 53/230, 550, 563, 152, 154, 222–232; 198/430, 468.1, 746; 221/202, 205, 150 R, 298, 150 HC; 414/791.6, 790.9, 795.3, 790.3, 794.7, 798; 425/114, 145, 149, 38, 40, 46–48, 375, 406, 462, 503, 434, 435, 308, 207, 209, 577, 133.5; 426/94, 103, 274, 275, 524

[56] References Cited

U.S. PATENT DOCUMENTS

| | | | |
|---|---|---|---|
| 2,794,404 | 6/1957 | Rapp | 99/450.7 |
| 2,868,141 | 1/1959 | Griner | 99/450.4 |
| 2,923,257 | 2/1960 | Monaco . | |
| 3,119,352 | 1/1964 | Fay . | |
| 3,119,353 | 1/1964 | Roehn, Jr. . | |
| 3,316,860 | 5/1967 | Peterson . | |
| 3,645,197 | 2/1972 | McMeekin et al. | 99/450.4 |
| 3,689,181 | 9/1972 | Maxwell | 425/207 |
| 3,828,660 | 8/1974 | Mueller et al. . | |
| 3,834,119 | 9/1974 | Armitt et al. . | |
| 3,844,699 | 10/1974 | Maxwell | 425/207 |
| 3,909,340 | 9/1975 | Solbeck . | |
| 4,172,480 | 10/1979 | Ellis . | |
| 4,391,832 | 7/1983 | Haas, Sr. et al. | 426/275 |
| 4,421,019 | 12/1983 | Hocking et al. | 99/450.1 |
| 4,440,072 | 4/1984 | Haas, Sr. et al. | 99/450.4 |
| 4,448,012 | 5/1984 | Kauffman et al. | 425/40 X |
| 4,537,121 | 8/1985 | Bero et al. | 99/450.1 |
| 4,584,933 | 4/1986 | Price | 425/145 X |
| 4,612,852 | 9/1986 | Price et al. | 99/450.4 |
| 4,767,304 | 8/1988 | Tashiro | 425/308 |
| 5,178,677 | 1/1993 | Hass et al. . | |
| 5,540,141 | 7/1996 | Grubzak . | |

FOREIGN PATENT DOCUMENTS

| | | |
|---|---|---|
| 1006400 | 3/1977 | Canada . |
| 1566800 | 5/1969 | France . |
| WO 9610923 | 4/1996 | WIPO . |

*Primary Examiner*—Timothy F. Simone
*Attorney, Agent, or Firm*—Klauber & Jackson

[57] ABSTRACT

In one embodiment, the present invention relates to an apparatus for the sequential assembly of a sandwich-type comestible product, such as an ice cream sandwich, and comprises an essentially horizontal conveyor, sequentially placed wafer dispensing assemblies and an extrusion assembly for the dispensing of a regulated amount of a comestible material. Wafer dispensing is controlled by a screw drive. Extrusion is accomplished by a front-loadable rotary head extruder. The wafer dispensing assemblies and the extruder are mounted in cantilevered fashion on a vertical wall, thereby facilitating the ease of repair, removal for retrofitting and cleaning. In addition, the extruder and the wafer dispensing assemblies are individually removable and may be replaced with like components of differing internal diameter, to accommodate the preparation of sandwich-type comestible products of differing size and shape.

31 Claims, 9 Drawing Sheets

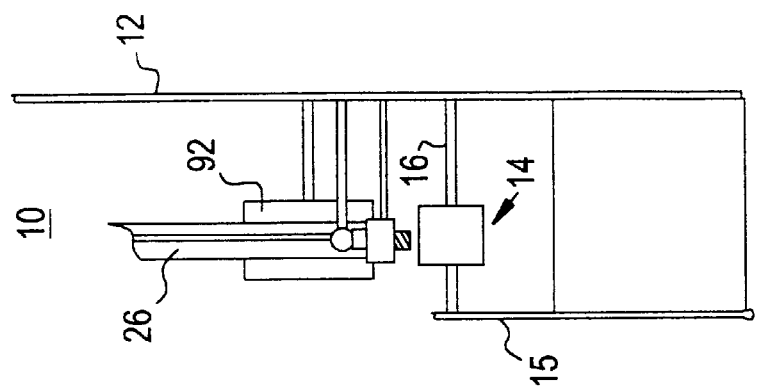
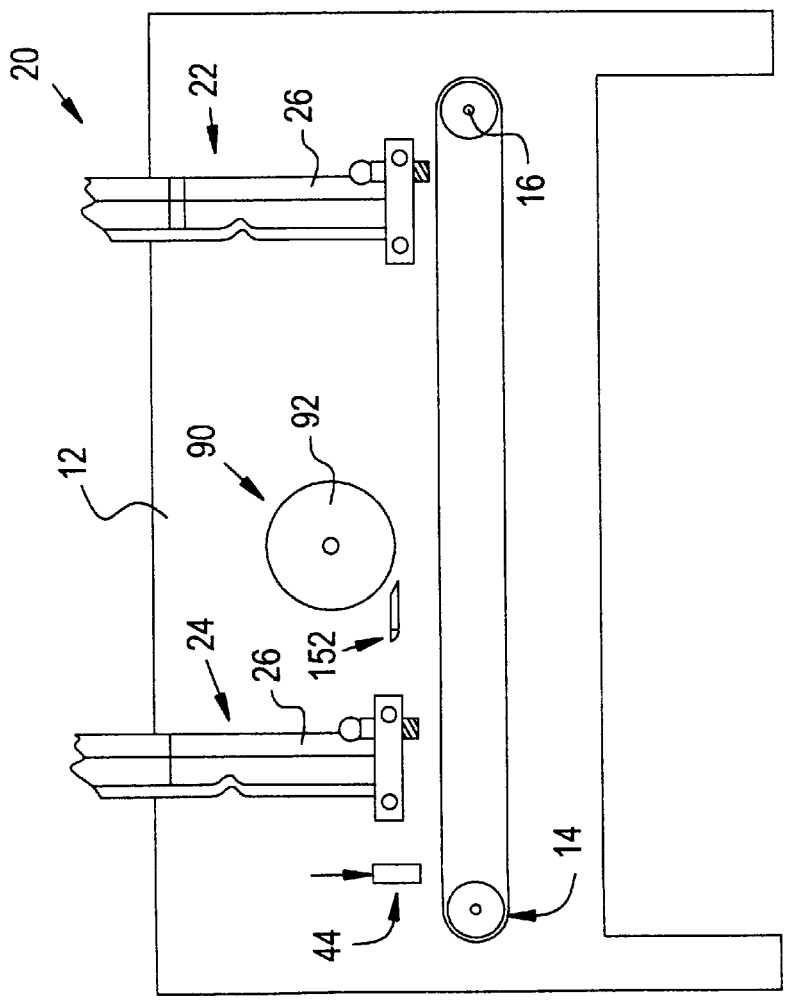

APPARATUS FOR THE ASSEMBLY OF SANDWICH PRODUCTS

BACKGROUND OF THE INVENTION

The present invention relates generally to an apparatus for the preparation of comestible-containing sandwich products, and more particularly, to an apparatus that may be utilized to fabricate ice cream sandwiches.

The fabrication of ice cream sandwiches and like sandwich-type comestible products is well-known, and a variety of techniques and corresponding apparatus are likewise available. Generally, ice cream sandwich fabricating apparatus follows the construction and operation best shown in U.S. Pat. No. 2,794,404 to Rapp. In this construction, the product is extruded and assembled while moving in the downward, vertical direction, after which it is placed on a horizontal conveyor for further treatment, as by the wrapping of the individual sandwiches thus prepared. Other patents illustrating this type of equipment include U.S. Pat. No. 3,316,860 to Peterson, U.S. Pat. No. 3,119,353 to Roehn, Jr. and U.S. Pat. No. 3,834,119 to Armitt et al.

In addition, there are disclosed other apparatus for the fabrication of sandwich-type comestible type products. For example, U.S. Pat. No. 2,923,257 to Monaco discloses an apparatus where the fabrication of an extruded sandwich-type comestible product is conducted along a linear track, commencing with the dispensing of a first wafer with its inner side upward, the conveying of said wafer to an extrusion station for the application of a quantity of a flowable comestible material thereon, and the continued conveyance from the extrusion station to a second wafer dispensing station, where the wafer forming the sandwich product is thereupon applied. U.S. Pat. No. 3,119,352 to Fay discloses a similar machine which provides for a plurality of wafer dispensing stations and a specific conformation of the conveyor means for the movement of the assembled wafer products. While both of the aforementioned disclosures reflect that sandwich-type products of this kind may be fabricated in the essentially horizontal direction, there is no explicit disclosure that the apparatus and corresponding method thereof is applicable to the fabrication of ice cream sandwiches. Further, U.S. Pat. No. 3,828,660 to Mueller et al. discloses a machine adapted for the assembly and packaging of an ice cream sandwich product by the sequential deposit of first and second wafers and the comestible material therebetween, followed by the introduction of the formed sandwich to a wrapping station, all accomplished horizontally and in line. While Mueller et al. extend to the assembly of ice cream sandwiches, the construction and operation of the machine still fails to accommodate certain of the difficulties inherent in high speed preparation of ice cream products, such as misfeeds and excessive down-time in repair and cleaning operations, all as discussed more generally hereinbelow.

Further, the achievement of the commercially optimal output of the manufacture of sandwich-type comestible products is hampered by the inability to adjust the equipment to accommodate different sizes of sandwich products and the economical maintenance of adequate sanitary conditions during the operation of the machines. Specifically, and with respect to ice cream sandwich products, such products are being made in increasing diversity of sizes and shapes. Individuality of such characteristics frequently defies the ability of any given machine to be utilized for their fabrication on an automated basis, as most sandwich machines rely upon the predetermination of the size of the wafer and the corresponding size of the flowable comestible material to be disposed therebetween. To such latter end, the extrusion die or orifice is usually very specifically preliminarily configured and lacks adjustability in its size and shape. Corresponding components of the machine, including the wafer trays or chutes, will rigidly conform to a specific size and shape to optimize the speed and accuracy of the delivery of the wafers for the fabrication of the sandwich product, and are likewise incapable of adjustment.

As a result thereof, diverse individual machines typically have been manufactured and maintained by a sandwich manufacturer in order to effectively commercially meet demand for products of differing dimension and shape. Problems frequently arise in the instance where particular demands for given products may fluctuate, and may thereby exceed the capabilities of the equipment on hand. The equipment in question has thus typically been incapable of rapid retrofitting to accommodate diversities in product dimensions and other characteristics.

Effective and rapid maintenance, in addition to the ability to generate products of differing shape and dimensions, has also presented an inherent difficulty in most sandwich making equipment. Most sandwich equipment is manufactured on a standard conveyor-type construction with parallel supporting members having the movable parts of the machine disposed therebetween. Likewise, chain drives, nozzles and other operative parts involved in the fabrication process are located in positions that are difficult to access and correspondingly more difficult to clean. Such an arrangement represents a significant expenditure of downtime for maintenance and repair, as any given piece of equipment is typically periodically inspected and cleaned or overhauled.

Lastly, U.S. Pat. No. 5,540,141 issued to Grubzak and commonly assigned herewith, and which is incorporated herein by reference in its entirety, describes a prior attempt to address some of the above concerns. While Grubzak proposes an overall machine design that responds to the need for ease of cleaning and adjustment to product size and shape, a need still exists for improvement in the efficiency and speed with which such adjustments and maintenance can be accomplished in operation.

In view of the above, a need clearly exists for the development and use of sandwich making machines that are capable at once of modification on a rapid basis to accommodate differences in the dimensions and other characteristics of the sandwich products being fabricated, and are likewise constructed with their primary components readily accessible for ease of cleaning and maintenance. It is toward the satisfaction of the aforementioned objectives that the present invention is directed.

SUMMARY OF THE INVENTION

In one aspect, the present invention relates to an apparatus for the preparation of sandwich-type comestible products from sandwich wafers and a comestible material.

The apparatus comprises a base including a vertically extending support wall, a substantially horizontal conveyor means, wafer dispensing means, and extrusion means for dispensing quantities of the comestible material. The horizontal conveyor means is disposed in front of the wall and may be supported by the base. The conveyor means has an input end and a discharge end. The wafer dispensing means is mounted on the base above the conveyor means to dispense sandwich wafers sequentially thereon.

The wafer dispensing means comprises a first dispensing station and a second dispensing station. The first dispensing station comprises a first wafer dispenser assembly located adjacent the input end of the conveyor means for the dispensing of a first wafer. The second dispensing station comprises a second wafer dispenser assembly located proximal to the discharge end of the conveyor means for the dispensing of a second wafer to complete the formation of the sandwich-type comestible product.

Each of the wafer dispenser assemblies comprises a chute and a screw conveyor means.

The chute is mounted on the base and defines a track for the reception and conveyance of a plurality of wafers, the track having an input mouth for accepting the wafers and an output mouth for dispensing the wafers, wherein the wafers descend from the input mouth and along the track to the output mouth. The screw conveyor means cooperates with the track proximate to the output mouth, for engaging each wafer individually and controlling the discharge of each wafer out of the output mouth. The extrusion means dispenses quantities of the comestible material onto the first wafer. The extrusion means includes a front end adapted to receive the comestible material and a back end attached to the base, wherein the extrusion means is disposed vertically above the conveyor means and between the first and second dispensing stations.

The extrusion means preferably includes comestible severing means for severing the comestible material after a desired quantity has been dispensed onto the first wafer.

The chutes are preferably removably mounted on the base.

In a preferred embodiment, the extrusion means comprises a rotary extruder assembly having a front end adapted to accept the comestible material into at least one cavity provided therein, wherein the rotary extruder assembly centripetally ejects the comestible material from the at least one cavity onto the first wafer. The rotary extruder assembly is further preferably mounted to the vertically extending support wall in a cantilevered fashion. At least part of the rotary extruder assembly is preferably of modular construction and adapted for removal and replacement with units of differing size.

Preferably, at least a portion of the track tapers inwardly in the direction of travel of the wafers.

The apparatus may also include tamping means positioned immediately downstream of the second dispensing station for pressing the second wafer downward to firmly engage the second wafer with the comestible material in the finally formed sandwich-type comestible product.

In a preferred embodiment, the present invention relates to an apparatus for the preparation of sandwich-type comestible products from sandwich wafers and a comestible material, wherein the apparatus comprises a base including a vertically extending support wall, a substantially horizontal conveyor means disposed in front of the wall, wafer dispensing means mounted on the base above the conveyor means to dispense sandwich wafers sequentially thereon, and extrusion means for dispensing quantities of the comestible material onto the first wafer. The conveyor means has an input end and a discharge end. The wafer dispensing means comprises a first dispensing station comprising a first wafer dispenser assembly located adjacent the input end of the conveyor means for the dispensing of a first wafer and a second dispensing station comprising a second wafer dispenser assembly located proximal to the discharge end of the conveyor means for the dispensing of a second wafer to complete the formation of the sandwich-type comestible product. Each of the wafer dispenser assemblies comprises a chute removably mounted on the base defining a track for the reception and conveyance of a plurality of wafers, the track having an input mouth for accepting the wafers and an output mouth for dispensing the wafers, wherein the wafers descend from the input mouth and along the track to the output mouth. Each of the wafer dispenser assemblies also comprises screw conveyor means which cooperates with the track proximate to the output mouth, for engaging each wafer individually and controlling the discharge of each wafer out of the output mouth. The extrusion means includes a rotary extruder assembly having a front end adapted to accept the comestible material into at least one cavity provided therein, wherein the rotary extruder assembly centripetally ejects the comestible material from the at least one cavity onto the first wafer, and comestible severing means for severing the comestible material after a desired quantity has been dispensed onto the first wafer.

At least part of the rotary extruder assembly is preferably of modular construction and adapted for removal and replacement with units of differing size.

In a preferred embodiment, the rotary extruder assembly comprises: an extruder manifold and an extruder ring removably attached to the extruder manifold, wherein the manifold and the ring at least partially define the at least one cavity, and wherein the at least one dispensing opening is provided on the circumferential periphery of the extruder ring.

At least a portion of the track may taper inwardly in the direction of travel of the wafers.

The apparatus also preferably includes tamping means positioned immediately downstream of the second dispensing station for pressing the second wafer downward to firmly engage the second wafer with the comestible material in the finally formed sandwich-type comestible product.

In another aspect, the present invention relates to a wafer dispenser means for dispensing wafers in a controlled manner. The wafer dispenser means preferably includes a chute and screw conveyor means. The chute defines a track for the reception and conveyance of a plurality of wafers, and the track has an input mouth for accepting the wafers and an output mouth for dispensing the wafers, wherein the wafers descend from the input mouth along the track to the output mouth. The screw conveyor means cooperates with the track proximate to the output mouth for engaging each wafer individually and controlling the discharge of each wafer out of the output mouth.

In yet another aspect, the present invention relates to a wafer dispenser assembly for use with an apparatus for the preparation of sandwich-type comestible products, the apparatus including: a support base including a vertically extending support wall; a substantially horizontal conveyor means disposed in front of the wall, the conveyor means having an input end and a discharge end; a first dispensing station located above the conveyor means and adjacent the input end of the conveyor means for the dispensing of a first wafer; a second dispensing station located above the conveyor means and downstream of the first dispensing station for the dispensing of a second wafer; and extrusion means for dispensing quantities of comestible material onto the first wafer, the extrusion means being attached to the base and located vertically above the conveyor means and between the first and second dispensing stations; wherein the wafer dispenser assembly is capable of being disposed at one of the dispensing stations; and wherein the wafer dispenser assembly comprises a chute mountable on the base defining a track for the reception and conveyance of a plurality of wafers, the track having an input mouth for accepting the wafers and an output mouth for dispensing the wafers, wherein the wafers descend from the input mouth along the track to the output mouth, and screw conveyor means cooperating with the track proximate to the output mouth for engaging each wafer individually and controlling the discharge of each wafer out of the output mouth. The extrusion means preferably includes comestible severing means for severing the comestible material after a desired quantity has been dispensed onto the first wafer by the extrusion means.

In a preferred embodiment, the chute allows the wafers to descend substantially without rotating about an upright axis.

In one preferred embodiment, at least a portion of the track tapers inwardly in the direction of travel of the wafers.

The screw advance means preferably comprises at least one upright screw having a plurality of helical threads, wherein the threads engage and draw each wafer downward upon rotation of the screw. Each wafer may be slidingly captured by an adjacent pair of the helical threads as the wafer advances past the at least one upright screw.

In one embodiment, the adjacent pair of the helical threads form a helical groove adapted to accept an edge of each wafer, wherein rotation of the at least one upright screw causes the edge of the wafer to vertically descend while sliding with respect to the at least one upright screw within the helical groove, whereby the wafer advances downwardly.

Furthermore, the at least one upright screw may include a generally horizontal top thread, wherein each wafer abuts the top thread when the wafer initially contacts the at least one upright screw, wherein the top thread temporarily delays engagement between the wafer and the adjacent pair of helical threads.

In another preferred embodiment, the at least one upright screw comprises a plurality of upright screws arranged around the periphery of the output mouth. One or more of the plurality of upright screws may thus engage a wafer as it travels past; a single wafer may thus be engaged by more than one screw at a time.

In a preferred embodiment, the chute comprises at least one upright guide member having an indented portion for temporarily detaining one end of each wafer on its descent, thereby causing each wafer to descend in a generally inclined orientation toward the screw advance means, wherein the bottom edge of each wafer contacts the screw advance means as each wafer sequentially encounters the screw advance means.

The indented portion may define an upper section and a lower section of the chute, wherein the wafers descend in a generally horizontal orientation in the upper section, and wherein the wafers descend in a generally inclined orientation in the upper section.

In yet another aspect, the present invention relates to a rotary extrusion means for dispensing a comestible material, the means including a front end adapted to accept the comestible material into at least one cavity provided therein, wherein the rotary extruder assembly centripetally ejects the comestible material from the at least one cavity through at least one dispensing opening disposed on a circumferential periphery. The rotary extrusion means preferably includes a removable die member, wherein the at least one dispensing opening is provided in the removable die member.

In a preferred embodiment, the present invention is a rotary extrusion means for use with an apparatus for the preparation of sandwich-type comestible products, the apparatus including a support base including a vertically extending support wall, a substantially horizontal conveyor means disposed in front of the wall, the conveyor means having an input end and a discharge end, and wafer dispensing means mounted on the base above the conveyor means to dispense sandwich wafers sequentially thereon. The wafer dispensing means comprises a first dispensing station located adjacent the input end of the conveyor means for the dispensing of a first wafer, and a second dispensing station. The rotary extrusion means includes a back end capable of being attached to the vertical extending support wall and capable of being disposed vertically above the conveyor means between the first and second dispensing stations. The rotary extrusion means also includes a front end adapted to accept the comestible material, wherein the rotary extruder assembly centripetally ejects the comestible material from the at least one cavity onto the first wafer. The rotary extrusion means further includes comestible severing means for severing the comestible material after a desired quantity has been dispensed onto the first wafer.

The rotary extrusion means further preferably comprises a rotary extrusion assembly which includes extruder drive means mounted to the base, a drive shaft connected to the extruder drive means and rotatably driven thereby, and a rotary extruder head attached to the drive shaft and driven thereby, the rotary extruder head including an outward facing hollow delivery tube for allowing comestible material to be front-loaded into at least one cavity provided therein, the rotary extruder head further being provided with at least one dispensing opening disposed on its circumferential periphery. The assembly is adapted to receive comestible material while the rotary head is rotated by the extruder drive means via the shaft, whereby comestible material travels through the delivery tube, into the cavity, and out the at least one dispensing opening.

The rotary extruder head further preferably comprises an extruder manifold and an extruder ring removably attached to the extruder manifold, wherein the manifold and the ring at least partially define the at least one cavity and wherein the at least one dispensing opening is provided on the circumferential periphery of the extruder ring.

Accordingly, it is an object of the present invention to provide an apparatus for the manufacture of sandwich-type comestible materials in the linear direction, that utilizes a sequential assembly including the extrusion of a flowable comestible product on top of a wafer, wherein the apparatus is capable of adjustment to accommodate the manufacture of comestible sandwich- type products of differing sizes and shapes and which is capable of producing the sandwich-product in a controlled manner at production speeds.

It is a further object of the present invention to provide a machine as aforesaid that is of modular construction and facilitates the ease of removal and retrofitting of particular components thereof to accommodate such differences in the size and shape of sandwich products being prepared.

It is a yet further object of the present invention to provide a machine as aforesaid that is so constructed as to enhance the ease of repair, retrofitting and cleaning.

Other objects of the present invention, as well as particular features, elements, and advantages thereof, will be elucidated in, or be apparent from, the following description and the accompanying drawing figures.

BRIEF DESCRIPTION OF THE DRAWINGS

Understanding of the present invention and the various aspects thereof will be facilitated by reference to the accompanying drawing figures, submitted for purposes of illustration only and not intended to limit the scope of the invention, in which:

FIG. 1 is a schematic representation of a front elevational view of the apparatus of the present invention;

FIG. 2 is a side elevational view of the apparatus of FIG. 1;

DETAILED DESCRIPTION

Figure 4:
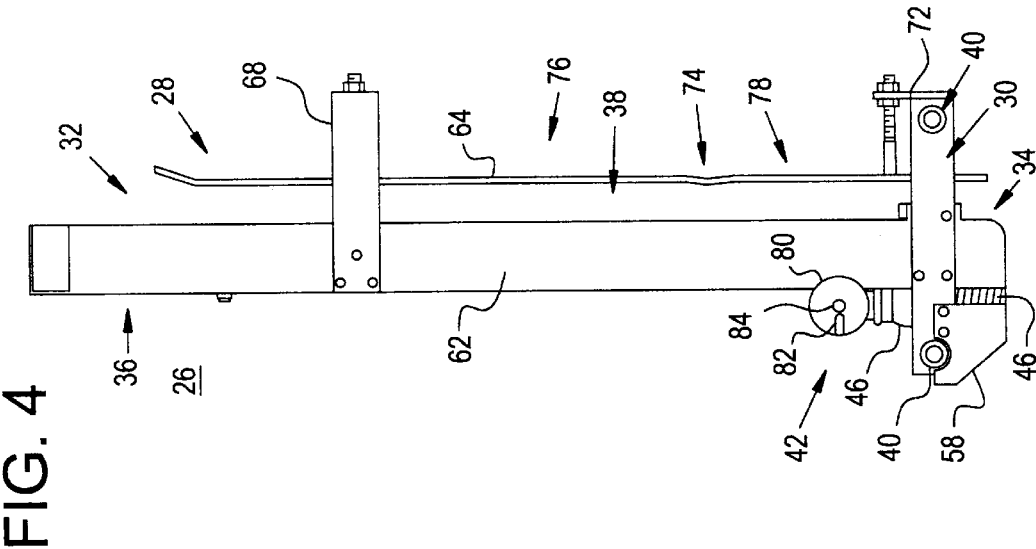
FIG. 4 is a side elevational view of the wafer dispensing assembly of FIG. 3.

The present invention relates to apparatus for the preparation of sandwich-type comestible products.

In one aspect, the present invention relates to an apparatus for the preparation of sandwich-type comestible products from sandwich wafers and a comestible material.

The apparatus comprises a base including a vertically extending support wall, a substantially horizontal conveyor means, wafer dispensing means, and extrusion means for dispensing quantities of the comestible material. The horizontal conveyor means is disposed in front of the wall and may be supported by the base. The conveyor means has an input end and a discharge end. The wafer dispensing means is mounted on the base above the conveyor means to dispense sandwich wafers sequentially thereon.

The wafer dispensing means comprises a first dispensing station and a second dispensing station. The first dispensing station comprises a first wafer dispenser assembly located adjacent the input end of the conveyor means for the dispensing of a first wafer. The second dispensing station comprises a second wafer dispenser assembly located proximal to the discharge end of the conveyor means for the dispensing of a second wafer to complete the formation of the sandwich-type comestible product.

Each of the wafer dispenser assemblies comprises a chute and a screw conveyor means.

The chute is mounted on the base and defines a track for the reception and conveyance of a plurality of wafers, the track having an input mouth for accepting the wafers and an output mouth for dispensing the wafers, wherein the wafers descend from the input mouth and along the track to the output mouth.

The screw conveyor means cooperates with the track proximate to the output mouth, for engaging each wafer individually and controlling the discharge of each wafer out of the output mouth. The extrusion means dispenses quantities of the comestible material onto the first wafer. The extrusion means includes a front end adapted to receive the comestible material and a back end attached to the base, wherein the extrusion means is disposed vertically above the conveyor means and between the first and second dispensing stations.

The extrusion means preferably includes comestible severing means for severing the comestible material after a desired quantity has been dispensed onto the first wafer.

The chutes are preferably removably mounted on the base.

In a preferred embodiment, the extrusion means comprises a rotary extruder assembly having a front end adapted to accept the comestible material into at least one cavity provided therein, wherein the rotary extruder assembly centripetally ejects the comestible material from the at least one cavity onto the first wafer. The rotary extruder assembly is further preferably mounted to the vertically extending support wall in a cantilevered fashion. At least part of the rotary extruder assembly is preferably of modular construction and adapted for removal and replacement with units of differing size.

Preferably, at least a portion of the track tapers inwardly in the direction of travel of the wafers.

The apparatus may also include tamping means positioned immediately downstream of the second dispensing station for pressing the second wafer downward to firmly engage the second wafer with the comestible material in the finally formed sandwich-type comestible product.

In a preferred embodiment, the present invention relates to an apparatus for the preparation of sandwich-type comestible products from sandwich wafers and a comestible material, wherein the apparatus comprises a base including a vertically extending support wall, a substantially horizontal conveyor means disposed in front of the wall, wafer dispensing means mounted on the base above the conveyor means to dispense sandwich wafers sequentially thereon, and extrusion means for dispensing quantities of the comestible material onto the first wafer. The conveyor means has an input end and a discharge end. The wafer dispensing means comprises a first dispensing station comprising a first wafer dispenser assembly located adjacent the input end of the conveyor means for the dispensing of a first wafer and a second dispensing station comprising a second wafer dispenser assembly located proximal to the discharge end of the conveyor means for the dispensing of a second wafer to complete the formation of the sandwich-type comestible product. Each of the wafer dispenser assemblies comprises a chute removably mounted on the base defining a track for the reception and conveyance of a plurality of wafers, the track having an input mouth for accepting the wafers and an output mouth for dispensing the wafers, wherein the wafers descend from the input mouth and along the track to the output mouth. Each of the wafer dispenser assemblies also comprises screw conveyor means which cooperates with the track proximate to the output mouth, for engaging each wafer individually and controlling the discharge of each wafer out of the output mouth. The extrusion means includes a rotary extruder assembly having a front end adapted to accept the comestible material into at least one cavity provided therein, wherein the rotary extruder assembly centripetally ejects the comestible material from the at least one cavity onto the first wafer, and comestible severing means for severing the comestible material after a desired quantity has been dispensed onto the first wafer.

At least part of the rotary extruder assembly is preferably of modular construction and adapted for removal and replacement with units of differing size.

In a preferred embodiment, the rotary extruder assembly comprises: an extruder manifold and an extruder ring removably attached to the extruder manifold, wherein the manifold and the ring at least partially define the at least one cavity, and wherein the at least one dispensing opening is provided on the circumferential periphery of the extruder ring.

At least a portion of the track may taper inwardly in the direction of travel of the wafers.

The apparatus also preferably includes tamping means positioned immediately downstream of the second dispensing station for pressing the second wafer downward to firmly engage the second wafer with the comestible material in the finally formed sandwich-type comestible product.

In another aspect, the present invention relates to a wafer dispenser means for dispensing wafers in a controlled manner. The wafer dispenser means preferably includes a chute and screw conveyor means. The chute defines a track for the reception and conveyance of a plurality of wafers, and the track has an input mouth for accepting the wafers and an output mouth for dispensing the wafers, wherein the wafers descend from the input mouth along the track to the output mouth. The screw conveyor means cooperates with the track proximate to the output mouth for engaging each wafer individually and controlling the discharge of each wafer out of the output mouth.

In yet another aspect, the present invention relates to a wafer dispenser assembly for use with an apparatus for the preparation of sandwich-type comestible products, the apparatus including: a support base including a vertically extending support wall; a substantially horizontal conveyor means disposed in front of the wall, the conveyor means having an input end and a discharge end; a first dispensing station located above the conveyor means and adjacent the input end of the conveyor means for the dispensing of a first wafer; a second dispensing station located above the conveyor means and downstream of the first dispensing station for the dispensing of a second wafer; and extrusion means for dispensing quantities of comestible material onto the first wafer, the extrusion means being attached to the base and located vertically above the conveyor means and between the first and second dispensing stations; wherein the wafer dispenser assembly is capable of being disposed at one of the dispensing stations; and wherein the wafer dispenser assembly comprises a chute mountable on the base defining a track for the reception and conveyance of a plurality of wafers, the track having an input mouth for accepting the wafers and an output mouth for dispensing the wafers, wherein the wafers descend from the input mouth along the track to the output mouth, and screw conveyor means cooperating with the track proximate to the output mouth for engaging each wafer individually and controlling the discharge of each wafer out of the output mouth. The extrusion means preferably includes comestible severing means for severing the comestible material after a desired quantity has been dispensed onto the first wafer by the extrusion means.

In a preferred embodiment, the chute allows the wafers to descend substantially without rotating about an upright axis.

In one preferred embodiment, at least a portion of the track tapers inwardly in the direction of travel of the wafers.

The screw advance means preferably comprises at least one upright screw having a plurality of helical threads, wherein the threads engage and draw each wafer downward upon rotation of the screw. Each wafer may be slidingly captured by an adjacent pair of the helical threads as the wafer advances past the at least one upright screw.

In one embodiment, the adjacent pair of the helical threads form a helical groove adapted to accept an edge of each wafer, wherein rotation of the at least one upright screw causes the edge of the wafer to vertically descend while sliding with respect to the at least one upright screw within the helical groove, whereby the wafer advances downwardly.

Furthermore, the at least one upright screw may include a generally horizontal top thread, wherein each wafer abuts the top thread when the wafer initially contacts the at least one upright screw, wherein the top thread temporarily delays engagement between the wafer and the adjacent pair of helical threads.

In another preferred embodiment, the at least one upright screw comprises a plurality of upright screws arranged around the periphery of the output mouth. One or more of the plurality of upright screws may thus engage a wafer as it travels past; a single wafer may thus be engaged by more than one screw at a time.

In a preferred embodiment, the chute comprises at least one upright guide member having an indented portion for temporarily detaining one end of each wafer on its descent, thereby causing each wafer to descend in a generally inclined orientation toward the screw advance means, wherein the bottom edge of each wafer contacts the screw advance means as each wafer sequentially encounters the screw advance means.

The indented portion may define an upper section and a lower section of the chute, wherein the wafers descend in a generally horizontal orientation in the upper section, and wherein the wafers descend in a generally inclined orientation in the upper section.

In yet another aspect, the present invention relates to a rotary extrusion means for dispensing a comestible material, the means including a front end adapted to accept the comestible material into at least one cavity provided therein, wherein the rotary extruder assembly centripetally ejects the comestible material from the at least one cavity through at least one dispensing opening disposed on a circumferential periphery. The rotary extrusion means preferably includes a removable die member, wherein the at least one dispensing opening is provided in the removable die member.

In a preferred embodiment, the present invention is a rotary extrusion means for use with an apparatus for the preparation of sandwich-type comestible products, the apparatus including a support base including a vertically extending support wall, a substantially horizontal conveyor means disposed in front of the wall, the conveyor means having an input end and a discharge end, and wafer dispensing means mounted on the base above the conveyor means to dispense sandwich wafers sequentially thereon. The wafer dispensing means comprises a first dispensing station located adjacent the input end of the conveyor means for the dispensing of a first wafer, and a second dispensing station. The rotary extrusion means includes a back end capable of being attached to the vertical extending support wall and capable of being disposed vertically above the conveyor means between the first and second dispensing stations. The rotary extrusion means also includes a front end adapted to accept the comestible material, wherein the rotary extruder assembly centripetally ejects the comestible material from the at least one cavity onto the first wafer. The rotary extrusion means further includes comestible severing means for severing the comestible material after a desired quantity has been dispensed onto the first wafer.

The rotary extrusion means further preferably comprises a rotary extrusion assembly which includes extruder drive means mounted to the base, a drive shaft connected to the extruder drive means and rotatably driven thereby, and a rotary extruder head attached to the drive shaft and driven thereby, the rotary extruder head including an outward facing hollow delivery tube for allowing comestible material to be front-loaded into at least one cavity provided therein, the rotary extruder head further being provided with at least one dispensing opening disposed on its circumferential periphery. The assembly is adapted to receive comestible material while the rotary head is rotated by the extruder drive means via the shaft, whereby comestible material travels through the delivery tube, into the cavity, and out the at least one dispensing opening.

The rotary extruder head further preferably comprises an extruder manifold and an extruder ring removably attached to the extruder manifold, wherein the manifold and the ring at least partially define the at least one cavity and wherein the at least one dispensing opening is provided on the circumferential periphery of the extruder ring.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

Referring now to FIGS. 1 and 2, the apparatus 10 comprises a vertical base or wall 12 on which certain of the components of the apparatus are directly mounted in cantilevered fashion. The substantially horizontal conveyor means 14 is suspended between vertical legs such as at 15 to provide bipolar lateral support.

The conveyor means 14 may comprise a chain type conveyor comprising axles 16 in cantilevered fashion as shown located at both the infeed and the output ends, respectively. The conveyor means 14 may utilize paired sprockets and corresponding multiple chains traveling thereabout. Regularly spaced fingers may be mounted in relation to the chains, and may be positioned and configured to urge products forward during the manufacturing process.

Referring again to FIG. 1, apparatus 10 includes a wafer dispensing means 20 which comprises a first wafer dispenser station 22 and a second wafer dispenser station 24, each station comprising a respective wafer dispenser assembly 26. The first wafer dispenser assembly 26 is located adjacent the input end of the conveyor means 14 for the dispensing of a first wafer. The second wafer dispenser assembly 26 is located proximal to the discharge end of the conveyor means 14 for the dispensing of a second wafer to complete the formation of the sandwich-type comestible product.

Figure 3:
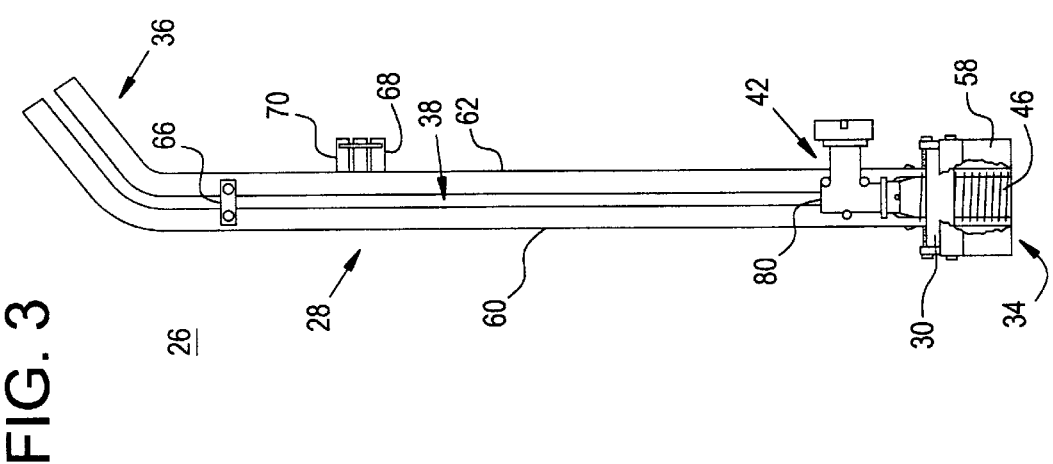
FIG. 3 is a rear elevational view of a wafer dispensing assembly of the present invention.

As seen in FIGS. 3 and 4, each of the wafer dispenser assemblies 26 comprise a chute 28, which includes a base mount 30 mounted to the base 12. The chute 28 has a top mouth 32 for accepting wafers and a bottom mouth 34 for dispensing wafers, wherein the chute 28 defines a channel therein adapted to allow the passage of wafers therethrough. Thus, the wafers descend from the top mouth 32 to the bottom mouth 34. The bottom mouth 34 corresponds to the shape of the wafer being dispensed to assure that an accurate discharge of a single wafer will occur on a sequential basis, and likewise to prevent jamming of wafers being loaded into the dispenser or chute 28.

The chute 28 is shown terminating at its uppermost portion in an inclined extension 36. The construction of the wafer chute 28 further preferably includes openings 38 that facilitate inspection of the wafer contents to detect misfed or broken wafers and to access the same for removal. The foregoing construction, however, may be modified by the absence of opening, all within the scope of the present invention.

The base mount 30 is shown provided with two holes 40 sized to accept bolts, rods, or other means of supporting the wafer dispenser assembly 26 in a cantilever fashion from the base 12 and adapted for detachable attachment to the base support 12 as illustrated generally in FIG. 1. Bearings are preferably provided in the openings 40 to facilitate rapid detachment and reattachment of the wafer dispensing assemblies 26 with the base 12. The base mount 30 of the wafer dispenser assembly 26 may thus be slid onto a pair of rods which extend horizontally from the vertical support wall of the base 12, then locked into place. Thus, the wafer dispenser assembly 26 is removable and may be replaced with a corresponding wafer dispenser assembly 26 of general configuration and size, but with an internal configuration or diameter that conforms to the shape of the intended product, such as an ice cream product. For example, oval, round, square, figurine or animal shaped, or other corresponding configurations may be accommodated. Preferably, the chute 28 allows the wafers to descend substantially without rotating about an upright axis, i.e., without rotating within the chute 28.

Each of the wafer dispenser assemblies 26 further comprise screw advance means 42 disposed proximate the outer periphery of the bottom mouth 34 for engaging each wafer individually and controlling the discharge of each wafer out of the bottom mouth 34.

A tamping means 44 is positioned immediately downstream of the second dispensing station for pressing the second wafer downward to firmly engage the second wafer with the comestible material in the finally formed sandwich-type comestible product. The fabricated sandwich product exiting from the wafer tamping means 44 is conveyed to the discharge end of the apparatus for further processing, such as for packaging and delivery.

Figure 5:
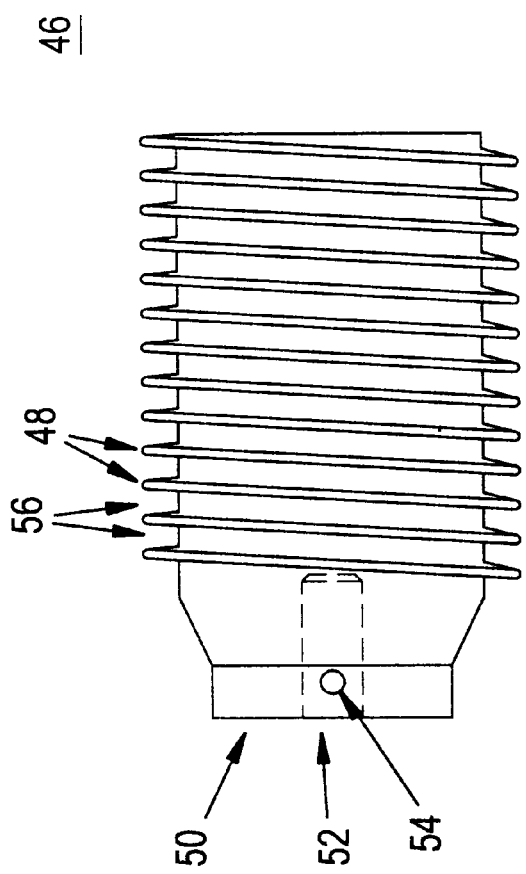
FIG. 5 is a side view of a particular embodiment of a screw for use in the wafer dispensing assembly.
Figure 6:
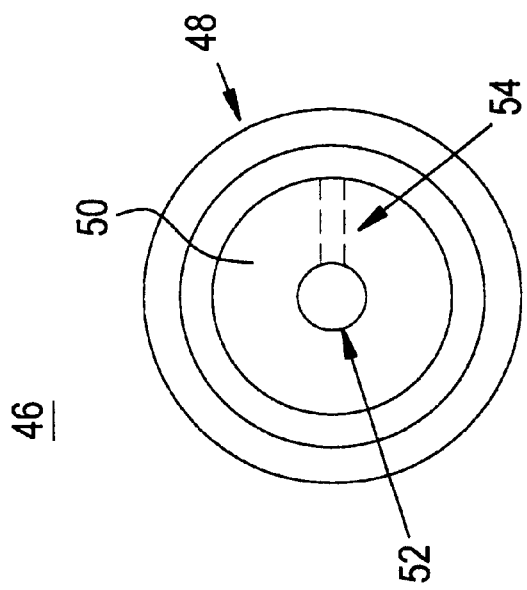
FIG. 6 is a top end view of the screw of FIG. 5.

FIGS. 5 and 6 illustrate one preferred embodiment of an upright screw 46 having a plurality of helical threads 48 which makes up part of the screw advance means 42. The screw 46 is shown with a top face 50 having a bore 52 for accepting a shaft or spindle which drives the rotation of the screw 46. A hole 54 is provided in the side of the top portion of the screw 46, and the hole 54 may be adapted to receive a set screw or the like for securing the screw to its drive shaft or spindle.

By way of example only and in no way intending to limit the present invention, one particular embodiment of a screw 46 according to the present invention has an overall length L1 of 4.25 inches, and the length of its threaded portion L2 is 3.21 inches, wherein 4 threads to the inch are provided thereon. The outer diameter of the threads, OD, is 2.45 inches, whereas the inner diameter at the threaded portion, ID, i.e. the general diameter of the cylindrical base of the threads, is a diameter of 2.031 inches. Thus, the screw 46 presents a plurality of grooves 56 having a depth of approximately 0.21 inches for engaging the wafers.

The screw 46 is positioned in relation to the chute 26 so that the threads 48 may engage and draw each wafer downward upon rotation of the screw 46. Thus, each wafer may be slidingly captured by an adjacent pair of the helical threads 48 as the wafer advances past the at least one upright screw 46. Preferably, the screw 46 is constructed so that the adjacent pair of the helical threads 48 form a helical groove 56 adapted to accept an edge of each wafer, wherein rotation of the at least one upright screw 46 causes the edge of the wafer to vertically descend while sliding with respect to the at least one upright screw 46 within the helical groove 56, whereby the wafer advances downwardly, most preferably while maintaining its orientation within the chute 26.

Referring again to FIGS. 3 and 4, the base mount 30 may include a guard member 58 which at least partially surrounds any exposed portions of the screw 46.

The upright screw 46 preferably has a generally horizontal top thread (not shown). Thus, each wafer can contact and abut the top thread after descending through the chute 26. When the wafer initially contacts the upright screw 46, the top thread temporarily delays engagement between the wafer and part of the helical threads 48.

Another preferred embodiment of the present invention comprises a plurality of upright screws 46 are arranged around the outer periphery of the bottom mouth 34. Among other advantages, the plurality of screws 46 enables wafers of various shapes, including arbitrary or irregularly shaped wafers, to be engaged by the screw means and advanced in a controlled fashion, as further discussed hereinbelow. By way of example, providing at least two screws 46, i.e. twin screws, significantly improves the handling and dispensing of round, oval, or triangularly shaped wafers as they pass through a chute. By way of further example, a wafer which has a narrowly shaped end or protrusion may also be accommodated by this embodiment. In at least example, the twin screw arrangement was found to be superior to the single screw in handling round wafers, whereby the twin screws reduced the possibility of the wafer teetering or tilting transversely within the chute, whereby the possibility of inadequate control of the dispensing of the wafers is further reduced by the additional engagement provided by the twin screw arrangement. Thus, the preferred embodiment helps to prevent wafers, particularly wafers of a size and shape which makes engagement with a single screw to be difficult, from jamming or breaking or preventing the orderly dispensing of said wafers as they pass through the chute.

Figure 7:
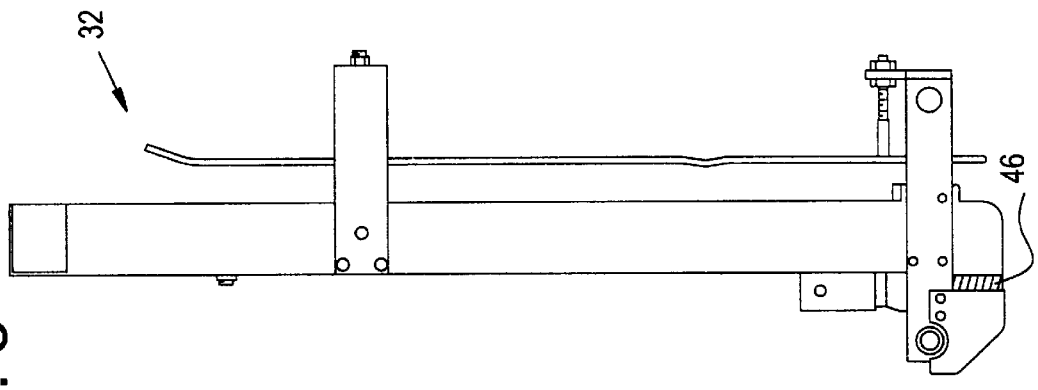
FIG. 7 is a rear elevational view of a wafer dispensing assembly including a chute and twin wafer dispenser screws according to a preferred embodiment of the present invention.

FIG. 7 shows a rear elevational view of a wafer dispensing assembly which includes a chute and twin wafer dispenser screws according to a preferred embodiment of the present invention. As described below, the twin screws are shown in a counter-rotating arrangement.

Figure 8:
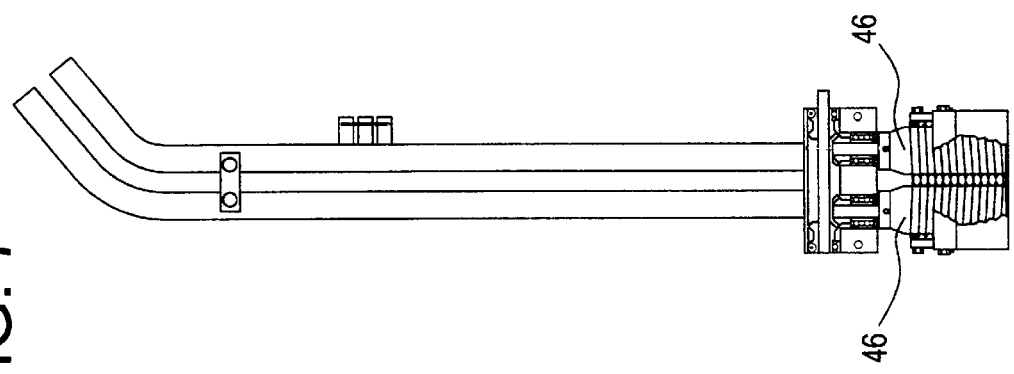
FIG. 8 is a side elevational view of the wafer dispensing assembly of FIG. 7.

FIG. 8 is a side elevational view of the wafer dispensing assembly of FIG. 7.

Figure 9:
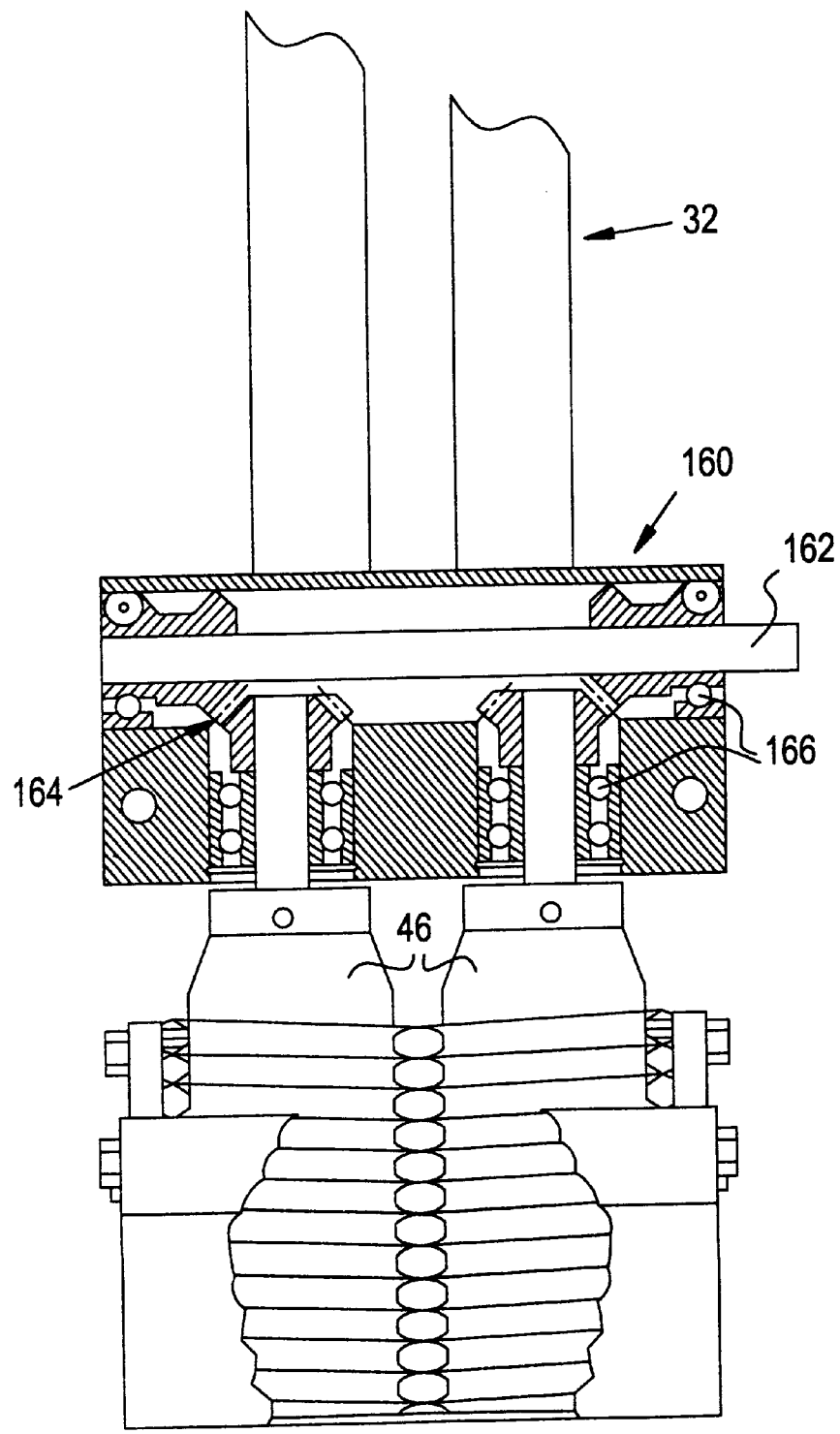
FIG. 9 is a close-up partial cutaway view of the twin screw subassembly of FIG. 7 showing means for counter-rotating the two wafer dispenser screws.

FIG. 9 is a close-up partial cutaway view of the twin screw subassembly of FIG. 7 showing means for counter-rotating the two wafer dispenser screws. Thus, a counter-rotating drive assembly 160 which includes a single drive shaft 162 and gearing means 164 can drive the two screws in opposite directions so as to present an expanded engagement surface between the wafer dispenser assembly and each wafer as the wafer passes therealong. Bearings 166 are preferably provided.

Figure 10:
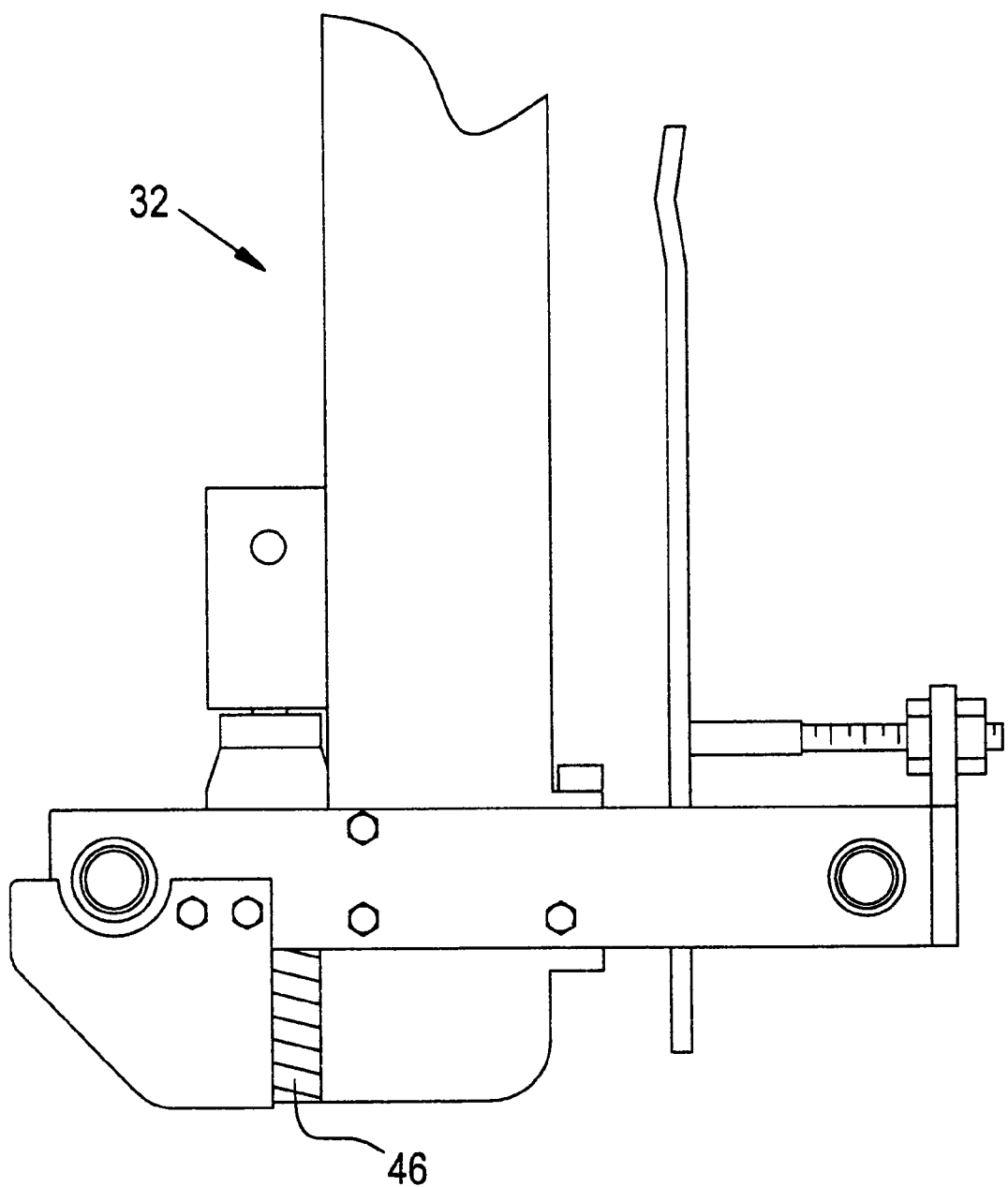
FIG. 10 is a side elevational view of the subassembly of FIG. 9.

FIG. 10 is a side elevational view of the subassembly of FIG. 9.

Referring again to FIGS. 3 and 4, the chute 28 is comprised of first and second upright chute members 60,62 and an upright guide member 64, all of which are spaced apart and configured to accept the wafers therebetween. The upper portions of the first and second chute members 60,62 are shown attached by the connecting bar 66. The guide member 64 is attached to one or both of the first and second upright chute members 60,62 by the guide mount 68, which may be spaced apart from the chute members 62,64 by spacers 70. Preferably the guide member 64 is adjustably attached to the guide mount 68, for example by the bolted connection for adjusting the position of the guide member 64 with respect to the chute members 60,62 and/or for adjusting the angle of inclination of the guide member 64 with respect to vertical. Similarly, the lower portion of the guide member 64 may be adjustably attached to the base mount 30 by an attached or integrally formed adjuster plate 72 and a bolted connection therewith.

As shown in FIGS. 3 and 4, the chute 28 includes an upright guide member 64 having an indented portion 74, protruding inward as part of the inner wall which is opposite the screw side of the chute 28. The indented portion 74 temporarily detains one end of each wafer on its descent through the channel, whereby the opposite end of each wafer descends undetained, thereby causing each wafer to descend in a generally slanted inclined orientation past the indented portion 74 and toward the screw advance means 42, wherein the bottom edge of each wafer eventually contacts the screw advance means 42. Thus, the wafers generally descend through the chute 28 to the screw advance means 42 by gravity feed.

The indented portion 74 thus may define an upper section 76 and a lower section 78 of the chute 28, wherein the wafers descend in a generally horizontal orientation in the upper section 76, and wherein the wafers descend in a generally inclined orientation in the lower section 78. Furthermore, the chute 28 may be tapered inwardly and downwardly, e.g. so as to maintain a desired inclined orientation of the wafers as they descend through the chute.

Thus, the screw means 42 includes an upright wafer dispensing screw 46 mounted to a coupling 80 and the screw 46 is rotated by the coupling 80. The coupling 80 may include an angle gear which is driven by an external drive means and which rotates the screw 46 in a controlled manner. The coupling 80 preferably includes a quickly connectable/disconnectable interface, such as the slot 82 cum hole 84 which can accept a pin and key extending out of a rotatably coupling drive head for centering and rotating the coupling 80.

As can be appreciated, the dispensing of wafers or wafer-life products can be accomplished in an orderly, controlled fashion, wherein the wafers sequentially pass along the screw means 42 at a desired spacing and at a desired speed or rate. Preferably the speed of operation of the screw means 42 is adjustable. Furthermore, the screw 46 may be adapted to be readily replaceable or interchangeable, thereby enhancing the modularity of the apparatus, e.g. to enable rapid changeover to differently sized or shaped ingredients. Moreover, the entire screw means 42 is preferably modular, e.g. readily removable and mountable.

Referring again to FIG. 1, the wafers deposited on the conveyor 14 travel forward toward the extrusion means 90 where a quantity of a flowable comestible product of predetermined height or volume is dispensed vertically downward thereon. The extrusion means 90 comprises, in its illustrated aspect, a rotary extruder assembly 92.

Figure 11:
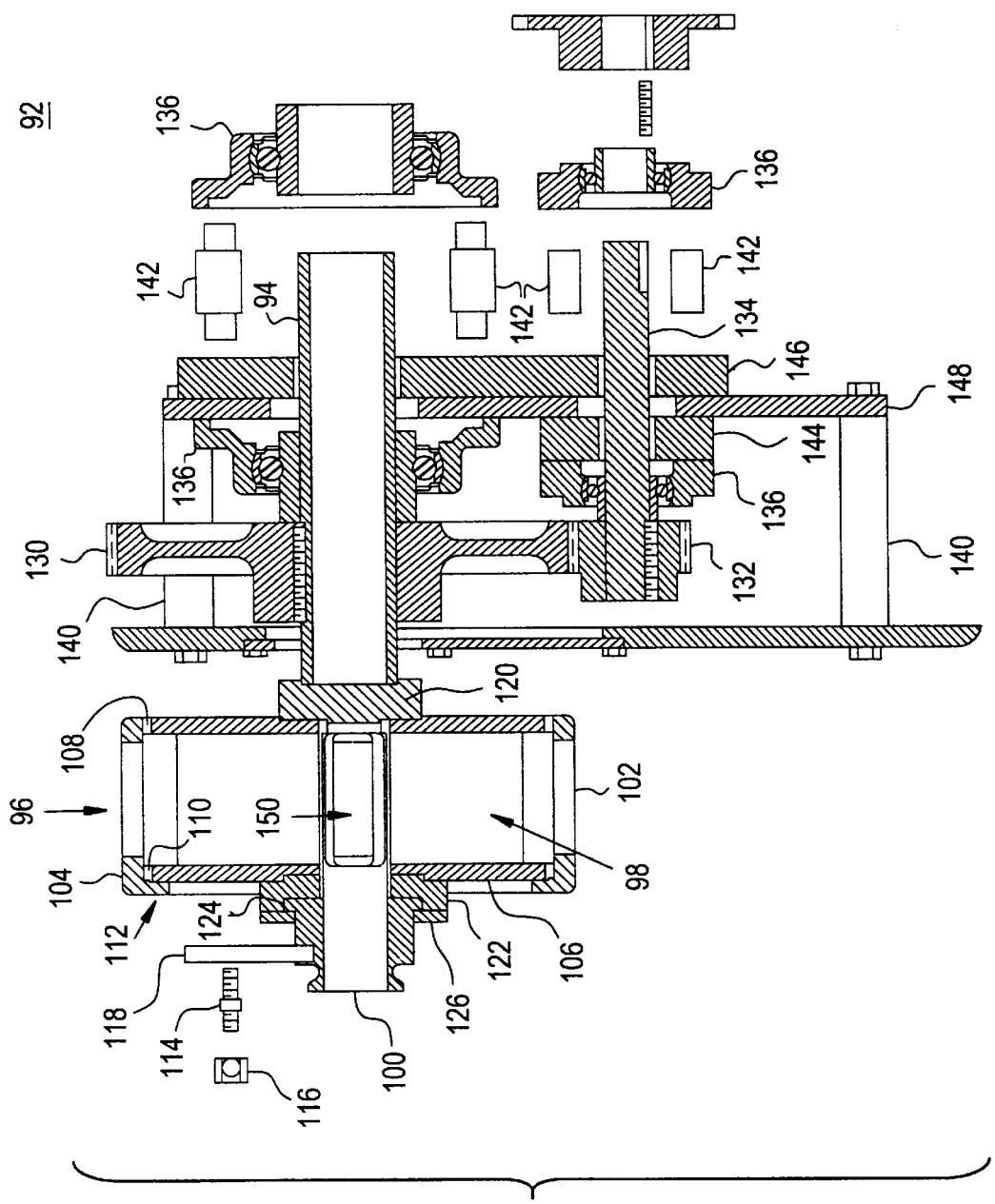
FIG. 11 is a side elevational cutaway view of a rotary extruder assembly, shown partially exploded, according to the present invention.

Referring to FIG. 11, the rotary extruder assembly 92 according to the present invention comprises extruder drive means mounted to the base (not shown), a drive shaft 94 connected to the extruder drive means and rotatably driven thereby, and a rotary extruder head 96 attached to the drive shaft 94 and driven thereby. The rotary extruder head 96 has at least one cavity 98 provided therein. An outward facing hollow delivery tube 100 accepts comestible material into the cavity or cavities 98 provided therein, thereby greatly facilitating the ease of connection and disconnection to an external source of comestible material. At least part of the rotary extruder head 96 should be easily interchanged in order to achieve different product results. Furthermore, the frontal connection to an external source of comestible material obviates the need for intermediate auxiliary refrigeration or pumping means to achieve acceptable flow and material properties since the external source may be located closer to the inlet of the extruder assembly 92. The rotary extruder head 96 includes at least one dispensing opening 102 disposed on its circumferential periphery. The assembly 92 is capable of receiving comestible material while at least part of the rotary head 96 is rotated by the extruder drive means via the shaft 94, whereby comestible material travels through the delivery tube 100, into the cavity 98, and out the at least one dispensing opening 102.

In particular, the illustrated rotary head 96 is comprised of a removable extruder ring 104 which is provided with one or more openings 102 disposed on its circumferential periphery through which the comestible material is deposited on the first wafers. The extruder ring 104 is disposed around an extruder manifold 106, and together the extruder ring 104 and the extruder manifold 106 form the one or more internal cavities 98 for holding the comestible material before the material is dispensed. O-rings are disposed between the ring and the manifold to help contain the comestible material. A first O-ring 108 is mounted in a recess on the circumferential outer periphery of the extruder manifold 106 for forming a first seal with the extruder ring 104. A second O-ring 110 is mounted in a recess on the inside circumferential surface of the extruder ring 104 for forming a second seal between the extruder ring 104 and the extruder manifold 106. The extruder ring 104 includes a front lip 112. Thus, the extruder ring 104 may be slid onto the extruder manifold 106 from the front and secured into place by pressing against any resistance offered by the first and second O-rings 108,110. The ring 104 may then be bolted into place with respect to the manifold 106. For example, in one embodiment, one or more forward facing studs 114 are attached to the front face of the manifold 106 in a location which corresponds to a position inside the inner circumference of the lip 112, so that the ring 104 may be slid onto the manifold 106 without interference from the stud 114. A nut 116 may then be screwed onto the stud 114 wherein the nut 116 and the stud 114 are adapted to allow the nut to engage part of the lip 112 of the ring 104, thereby securing the ring 104 to the manifold 106 so that both members may rotate together. The securement of the extruder ring 104 securely in place for production may be accomplished by means of a locking device or bolted connection or other quick change connection means.

The manifold 106 is driven by the drive shaft 94, and the manifold 106 and ring 104 are rotatable about the delivery tube 100. The delivery tube 100 includes a radial shaft 118 for fixed connection to the base 12 or other fixed object, such as the external supply of comestible material, in order to assist in preventing the delivery tube 100 from rotating. The manifold 106 abuts the stop 120 on the drive shaft 100. An extruder cap 122 fits against the front face of the manifold 106. The front face of the extruder cap 122 is provided with a recess adapted to receive the head portion of the delivery tube 100. An O-ring 124 provides a seal between the extruder cap 122 and the head portion of the delivery tube 100. The head portion of the delivery tube 100 is held in place against the extruder cap 122 by a retainer 126. A shaft gear 130 is keyed to the drive shaft 94, and a driving gear 132 is attached to a power shaft 134 to drive the shaft gear 130. The drive shaft 94 and the power shaft 134 are shown with bearing mounts 136. Stand-offs 140, adjuster bushings 142, and spacers 144 are also shown for achieving proper alignment and positioning with respect to an adjuster plate 146 and a mounting plate 148, as illustrated.

The delivery tube 100 is provided with one or more circumferential openings 150 through which the comestible material may pass to the cavity 98 formed by the manifold 106 and the ring 104. Thus, the rotary extruder assembly 92 is front loading or front-loadable, wherein the comestible material can be delivered to the delivery tube 100 opposite the base support and/or its vertical support wall.

Furthermore, the rotary extruder head 96 is preferably of modular construction and adapted for removal and replacement with units of differing size. Thus, for example, easier access, including easier maintenance, can be provided to equipment or lines or conduits, and in particular, to those lines which contain the flowable comestible material. By way of other example, better control of comestible material temperature (e.g. ice cream temperature) could be achieved by shorter paths, such as between a comestible material supply or source and the rotary extruder assembly 92, and by preventing the flow path of the comestible material to experience undesired heat loss or heat gain, e.g. due to proximity to other related machinery or other thermal environments. Thus, by providing a front-load extruder assembly, the present invention helps to reduce the need for additional equipment, instrumentation, and/or control, e.g. such as auxiliary refrigeration units for maintaining the temperature of an ice cream source flow, or a temperature control subsystem.

One preferred embodiment of the present invention comprises a rotary extruder head which is provided with a plurality of cavities through which the comestible material may pass. Furthermore, the rotary extruder may comprise means for regulating the flow of comestible material through one or more of the cavities.

Figure 12:
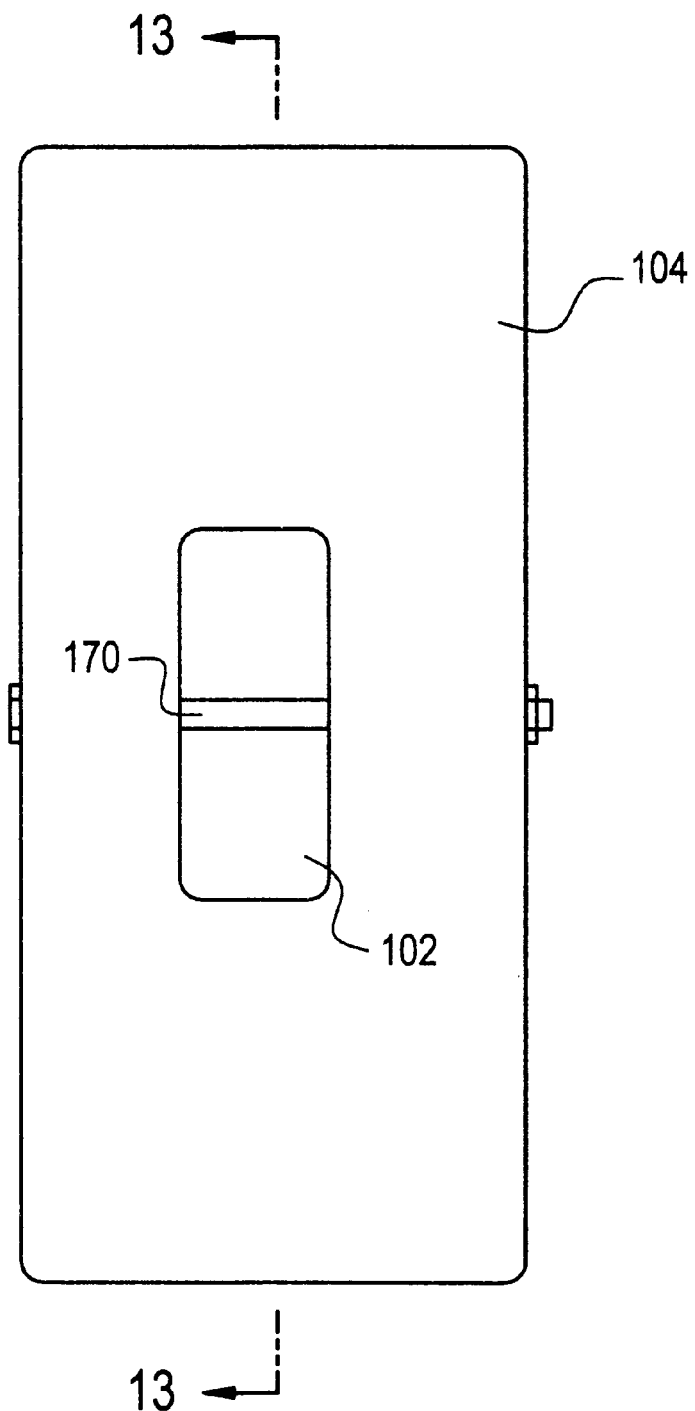
FIG. 12 is a side elevational view of a rotary extruder assembly according to a preferred embodiment of the present invention having means for regulating the flow of comestible material.

FIG. 12 is a side elevational view of a rotary extruder assembly according to a preferred embodiment of the present invention having means for regulating the flow of comestible material. The flow regulation means is provided by a transverse rod 170 attached to the extruder manifold and extending across its associated cavity.

Figure 13:
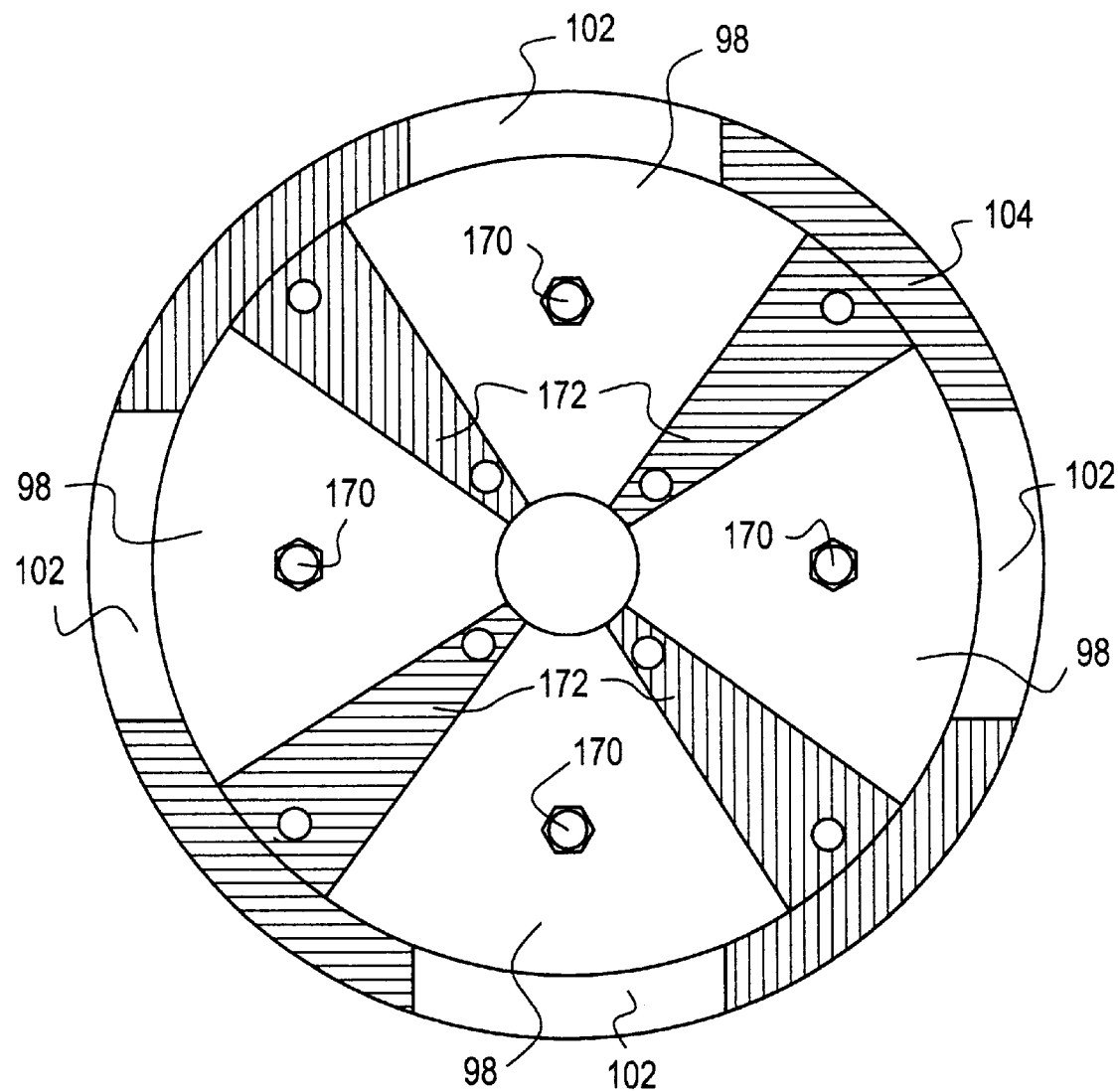
FIG. 13 is a cross-sectional view of the rotary extruder of FIG. 12 taken along line 13—13, wherein the rotary extruder is provided with four internal cavities for accommodating comestible material which is flowable therethrough.

FIG. 13 is a cross-sectional view of the rotary extruder of FIG. 12 taken along line 13—13, showing that the rotary extruder is provided with four internal cavities 98, defined in part by four walls or baffles 172, for accommodating comestible material which is flowable therethrough. A transverse rod 170 is attached to the extruder manifold and extends across each respective cavity 98. The transverse rods 170 are thus placed in the path of comestible material flowing from the delivery tube 100 to an associated one or more opening 102 in the extruder ring 104. Experiments have shown that the transverse rods improve the uniformity of the outlet flow of comestible material from the extruder assembly. That is, each slab of comestible material, such as ice cream, is more uniformly or more consistently obtained from the present invention, whereby control of the apparatus and its product can be improved, and whereby the quality control of the resulting product can be improved.

One of the aspects of the present invention is thus the modularity of its components. In the instance of the extruder means 90, this is represented by the interchangeability of extruder rings 104 and their replacement with rings of differing size and shape, to accommodate corresponding differences in the configuration of the desired comestible product to be extruded. Each of the extruder rings 104 has identical means for detachable attachment to the base 12 to facilitate their interchangeability. The specific construction of the present apparatus facilitates the rapid changeover required for the manufacture of products of differing shape and/or size.

It can be seen from the above and foregoing that the cantilevered construction of the apparatus of the present invention and its reliance upon the vertical wall for support and operation, places the operable components of the apparatus in clear and unobstructed position, visible for removal, repair and cleaning. Moreover, the adjustability of the conveyors 14 themselves in conjunction with the removeability and modular construction of the wafer dispensing assemblies 26 and the extruder heads 96, makes it possible to convert a given apparatus to accommodate fluctuations in demand for specific sandwich-type comestible products, without the need for maintaining a large inventory of apparatus of differing dimensions.

The conveyor means 14 may also be adjustable so as to accommodate differences in the size and particularly the width dimension of the comestible products being manufactured.

The completion of the extrusion of the quantity of the comestible material onto the first wafer is followed by the severing of the comestible product from the extruder means 90 by a severing means 152, e.g. by a reciprocating wire cutting means or heated wire cutting means or other by severing device within the skill of the art may be utilized.

The apparatus may be actuated by the operation of a single electric motor which in turn, is connected by coordinated drives, such as chain drives, so that the movement of the conveyors, the extrusion of the comestible product and the sequential disposition of the wafers, both before and after extrusion, is centrally controlled.

After the comestible material has been extruded and cut as described above, it is indexed to the second wafer dispensing station 24, likewise comprising a wafer dispensing assembly 26 detachably attached to the base 12. At this station, the second wafer is deposited, open face down, to form the completed comestible sandwich. The tamping means 44 is disposed downstream, preferably immediately downstream, of the second wafer dispensing station 24. The tamping means 44 may work by the force of its own weight, generated by gravity, to lightly tap the upper wafer of the sandwich product as it exits the second dispensing station 24, to further secure the integrity of the thus formed sandwich product. The conveyor 14 then moves the sandwich products thus formed to the discharge end thereof, where it may directed thencely to a wrapping station and/or for further processing.

As discussed earlier, the apparatus 10 of the present invention is preponderantly constructed about a single vertical wall 12. Moreover, certain of the components of the apparatus, and particularly the wafer dispensing assemblies 26 and the extruder rings 104, may be entirely removed and replaced with elements of differing internal shape to facilitate the fabrication of products of differing thickness, configuration or diameter. Thus, the aforementioned components of the apparatus of the present invention are preferably mounted in cantilevered fashion on a vertical support wall and are thereby highly accessible and visible for the repair, retrofitting and sanitation thereof in use.

To the extent that specific functions of the machine require predetermined programming, appropriate electrical connection to devices such as programmable logic controllers, not illustrated herein, are made that assure coordination of all machine sequences and functions.

Having described specific preferred embodiments of the invention with reference to the accompanying drawings, it will be appreciated that the present invention is not limited to those specific embodiments, and that various changes and modifications can be effected therein by one of ordinary skill in the art without departing from the scope or spirit of the invention as defined by the appended claims.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for the preparation of sandwich-type comestible products from sandwich wafers and a comestible material, said apparatus comprising:

a base including a vertically extending support wall;

a substantially horizontal conveyor means disposed in front of said wall, said conveyor means having an input end and a discharge end;

wafer dispensing means mounted on said base above said conveyor means to dispense sandwich wafers sequentially thereon, said wafer dispensing means comprising:

a first dispensing station comprising a first wafer dispenser assembly located adjacent the input end of said conveyor means for the dispensing of a first wafer; and a second dispensing station comprising a second wafer dispenser assembly located proximal to the discharge end of said conveyor means for the dispensing of a second wafer to complete the formation of said sandwich-type comestible product, wherein each of said wafer dispenser assemblies comprises:

a chute mounted on said base defining a track for the reception and conveyance of a plurality of wafers, said track having an input mouth for accepting said wafers and an output mouth for dispensing said wafers, wherein said wafers descend from said input mouth and along said track to said output mouth; and screw conveyor means cooperating with said track proximate to said output mouth, for engaging each wafer individually and controlling the discharge of each wafer out of said output mouth; and extrusion means for dispensing quantities of the comestible material onto the first wafer, said extrusion means including a front end adapted to receive the comestible material and a back end attached to said base, wherein said extrusion means is disposed vertically above said conveyor means and between said first and second dispensing stations.

2. The apparatus according to claim 1 wherein said extrusion means further comprises comestible severing means for severing the comestible material after a desired quantity has been dispensed onto the first wafer.

3. The apparatus according to claim 1 wherein said chutes are removably mounted on said base.

4. The apparatus according to claim 1 wherein said extrusion means comprises a rotary extruder assembly having a front end adapted to accept the comestible material into at least one cavity provided therein, wherein said rotary extruder assembly centripetally ejects the comestible material from said at least one cavity onto the first wafer.

5. The apparatus according to claim 4 wherein said rotary extruder assembly is mounted to said vertically extending support wall in a cantilevered fashion.

6. The apparatus according to claim 4 wherein at least part of said rotary extruder assembly is of modular construction and adapted for removal and replacement with units of differing size.

7. The apparatus according to claim 1 wherein at least a portion of said track tapers inwardly in the direction of travel of said wafers.

8. The apparatus according to claim 1 further comprising tamping means positioned immediately downstream of said second dispensing station for pressing the second wafer downward to firmly engage the second wafer with said comestible material in the finally formed sandwich-type comestible product.

9. An apparatus for the preparation of sandwich-type comestible products from sandwich wafers and a comestible material, said apparatus comprising:
    a base including a vertically extending support wall;
    a substantially horizontal conveyor means disposed in front of said wall, said conveyor means having an input end and a discharge end;
    wafer dispensing means mounted on said base above said conveyor means to dispense sandwich wafers sequentially thereon, said wafer dispensing means comprising:
        a first dispensing station comprising a first wafer dispenser assembly located adjacent the input end of said conveyor means for the dispensing of a first wafer; and
        a second dispensing station comprising a second wafer dispenser assembly located proximal to the discharge end of said conveyor means for the dispensing of a second wafer to complete the formation of said sandwich-type comestible product,
        wherein each of said wafer dispenser assemblies comprises:
            a chute removably mounted on said base defining a track for the reception and conveyance of a plurality of wafers, said track having an input mouth for accepting said wafers and an output mouth for dispensing said wafers, wherein said wafers descend from said input mouth and along said track to said output mouth; and
            screw conveyor means cooperating with said track proximate to said output mouth, for engaging each wafer individually and controlling the discharge of each wafer out of said output mouth; and extrusion means for dispensing quantities of the comestible material onto the first wafer, said extrusion means including:
    a rotary extruder assembly having a front end adapted to accept the comestible material into at least one cavity provided therein, wherein said rotary extruder assembly centripetally ejects the comestible material from said at least one cavity onto the first wafer; and
    comestible severing means for severing the comestible material after a desired quantity has been dispensed onto the first wafer.

10. The apparatus according to claim 9 wherein at least part of said rotary extruder assembly is of modular construction and adapted for removal and replacement with units of differing size.

11. The apparatus according to claim 9 wherein said rotary extruder assembly comprises:
    an extruder manifold; and
    an extruder ring removably attached to said extruder manifold;
        wherein said manifold and said ring at least partially define said at least one cavity; and
        wherein said at least one dispensing opening is provided on the circumferential periphery of said extruder ring.

12. The apparatus according to claim 9 wherein at least a portion of said track tapers inwardly in the direction of travel of said wafers.

13. The apparatus according to claim 9 further comprising tamping means positioned immediately downstream of said second dispensing station for pressing the second wafer downward to firmly engage the second wafer with said comestible material in the finally formed sandwich-type comestible product.

14. A wafer dispenser means for dispensing wafers in a controlled manner, said means comprising:
    a chute defining a track for the reception and conveyance of a plurality of wafers, said track having an input mouth for accepting said wafers and an output mouth for dispensing said wafers, wherein said wafers descend from said input mouth along said track to said output mouth; and
    screw conveyor means cooperating with said track proximate to said output mouth for engaging each wafer individually and controlling the discharge of each wafer out of said output mouth.

15. The wafer dispenser assembly for use with an apparatus for the preparation of sandwich-type combustible products, said wafer dispenser assembly comprises:
    a chute mountable on said apparatus defining a track for the reception and conveyance of a plurality of wafers, said track having an input mouth for accepting said wafers and an output mouth for dispensing said wafers, wherein said wafers descend from said input mouth along said track to said output mouth; and
    screw conveyor means cooperating with said track proximate to said output mouth for engaging each wafer individually and controlling the discharge of each wafer out of said output mouth.

16. The combination according to claim 15 wherein said extrusion means includes comestible severing means for severing the comestible material after a desired quantity has been dispensed onto the first wafer by said extrusion means.

17. The wafer dispenser assembly according to claim 15 wherein said chute allows the wafers to descend substantially without rotating about an upright axis.

18. The wafer dispenser assembly according to claim 15 wherein at least a portion of said track tapers inwardly in the direction of travel of said wafers.

19. The wafer dispenser assembly according to claim 15 wherein said screw advance means comprises at least one upright screw having a plurality of helical threads; and wherein said threads engage and draw each wafer downward upon rotation of said screw.

20. The wafer dispenser assembly according to claim 19 wherein each wafer is slidingly captured by an adjacent pair of said helical threads as the wafer advances past said at least one upright screw.

21. The wafer dispenser assembly according to claim 20 wherein said adjacent pair of said helical threads form a helical groove adapted to accept an edge of each wafer, wherein rotation of said at least one upright screw causes the edge of the wafer to vertically descend while sliding with respect to said at least one upright screw within said helical groove, whereby the wafer advances downwardly.

22. The wafer dispenser assembly according to claim 20 wherein said at least one upright screw further comprises a generally horizontal top thread, wherein each wafer abuts said top thread when the wafer initially contacts said at least one upright screw, wherein said top thread temporarily delays engagement between the wafer and said adjacent pair of helical threads.

23. The wafer dispenser assembly according to claim 19 wherein said at least one upright screw comprises a plurality of upright screws arranged around the periphery of said output mouth.

24. The wafer dispenser assembly according to claim 15 wherein said chute comprises at least one upright guide member having an indented portion for temporarily detaining one end of each wafer on its descent, thereby causing each wafer to descend in a generally inclined orientation toward said screw advance means, wherein the bottom edge of each wafer contacts said screw advance means as each wafer sequentially encounters said screw advance means.

25. The wafer dispenser assembly according to claim 15 wherein said indented portion defines an upper section and a lower section of said chute, wherein the wafers descend in a generally horizontal orientation in said upper section, and wherein the wafers descend in a generally inclined orientation in said upper section.

26. A rotary extrusion means for dispensing a comestible material, said means including a front end adapted to accept the comestible material into at least one cavity provided therein, wherein said rotary extruder assembly centripetally ejects the comestible material from said at least one cavity through at least one dispensing opening disposed on a circumferential periphery.

27. The rotary extrusion means according to claim 26 wherein said rotary extrusion means includes a removable die member, and wherein said at least one dispensing opening is provided in said removable die member.

28. A rotary extrusion means for use with an apparatus for the preparation of sandwich-type comestible products having, a support base including a vertically extending support wall; a substantially horizontal conveyor; a first dispensing station and a second dispensing station; said rotary extrusion means comprising:

a back end capable of being attached to said vertical extending support wall and capable of being disposed vertically above said conveyor means between said first and second dispensing stations;

a front end adapted to accept the comestible material, wherein said rotary extruder assembly centripetally ejects the comestible material from said at least one cavity onto the first wafer; and comestible severing means for severing the comestible material after a desired quantity has been dispensed onto the first wafer.

29. The rotary extrusion means according to claim 28 wherein said rotary extrusion means comprises a rotary extrusion assembly including:

extruder drive means mounted to the base;

a drive shaft connected to the extruder drive means and rotatably driven thereby; and a rotary extruder head attached to the drive shaft and driven thereby, said rotary extruder head including an outward facing hollow delivery tube for allowing comestible material to be front-loaded into at least one cavity provided therein, said rotary extruder head further being provided with at least one dispensing opening disposed on its circumferential periphery;

wherein said assembly is capable of receiving comestible material while said rotary head is rotated by said extruder drive means via said shaft, whereby comestible material travels through the delivery tube, into the cavity, and out the at least one dispensing opening.

30. The rotary extrusion means according to claim 28 wherein said rotary extruder head further comprises:

an extruder manifold; and an extruder ring removably attached to said extruder manifold;

wherein said manifold and said ring at least partially define said at least one cavity; and wherein said at least one dispensing opening is provided on the circumferential periphery of said extruder ring.

31. The wafer dispenser assembly of claim 15 in combination with an apparatus for the preparation of sandwich-type comestible products, said combination including:

said apparatus including:

a support base including a vertically extending support wall;

a substantially horizontal conveyor means disposed in front of said wall, said conveyor means having an input end and a discharge end;

a first dispensing station located above said conveyor means and adjacent the input end of said conveyor means for the dispensing of a first wafer, a second dispensing station located above said conveyor means and downstream of said first dispensing station for the dispensing of a second wafer; and extrusion means for dispensing quantities of comestible material onto the first wafer, said extrusion means being attached to said base and located vertically above said conveyor means and between said first and second dispensing stations.

* * * * *